Oct. 19, 1965   R. E. PETRICK   3,213,185
DETACHABLE OUTLET FOR A UTILITY TABLE
Filed April 24, 1963
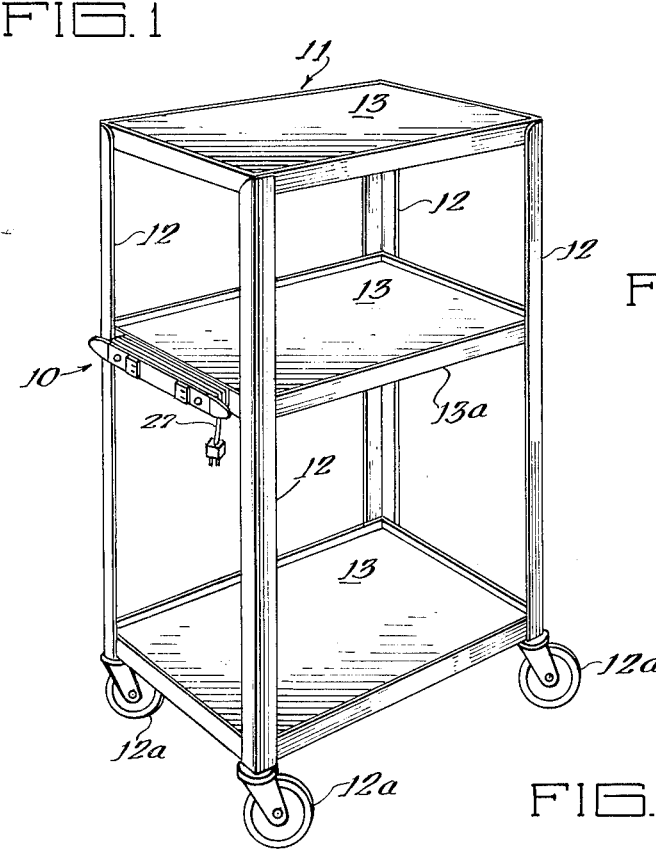
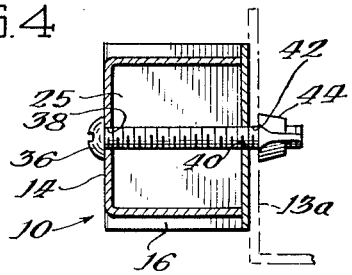
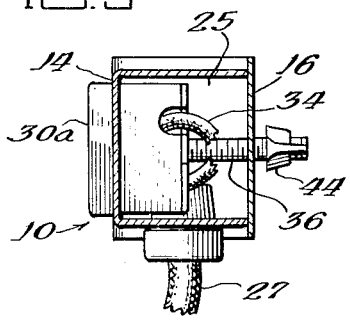
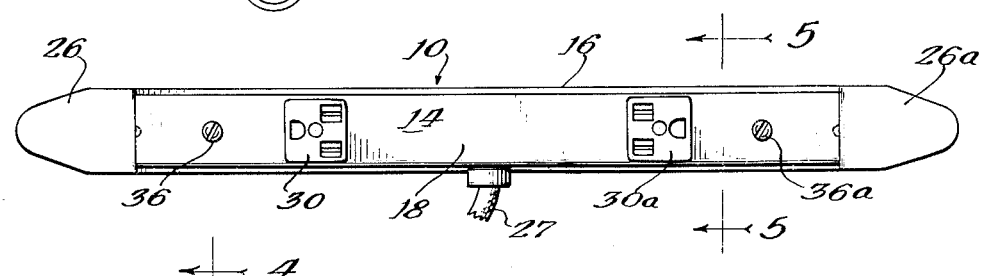
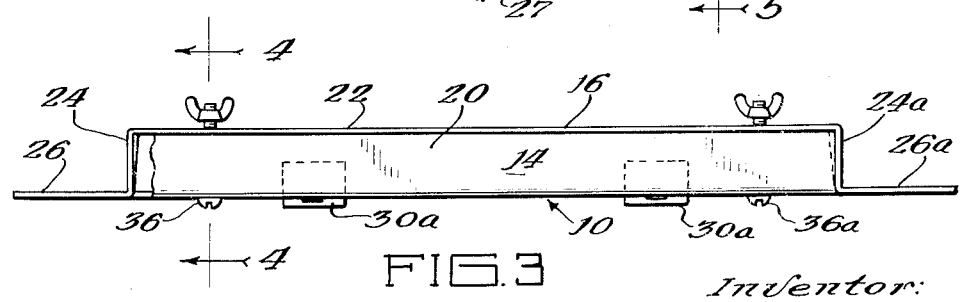
Inventor:
Russell E. Petrick United States Patent Office 3,213,185
Patented Oct. 19, 1965

3,213,185
DETACHABLE OUTLET FOR A UTILITY TABLE
Russell E. Petrick, Park Ridge, Ill., assignor to Bretford Manufacturing, Inc., a corporation of Illinois
Filed Apr. 24, 1963, Ser. No. 275,390
3 Claims. (Cl. 174—58)

This invention relates to utility tables and more particularly to a detachable electrical outlet therefor.

Utility tables are commonly used to provide a mobile support for intermittently used appliances, such as movie projectors, office machines and the like which may be temporarily positioned on a utility table. Often the devices supported by the table are electrically powered and the table must be positioned a greater distance away from an electrical outlet than the length of the cord carried by the electrical device supported thereby. This is especially true when the cable is being used in educational or commercial applications. Thus, it is desirable that the utility table have an outlet means thereon having a long extension cord connected to a wall outlet so that the relative short cord of the electrical device being carried thereby may be connected to a source of electrical power.

The detachable electrical outlet means of the present invention is provided with fastening means to enable the outlet means to be selectively positioned in the most convenient manner for the particular appliance being used. Furthermore, the outlet means incorporates structure which enables its long extension cord to be compactly wound in stored position when the utility table is not in use.

It is therefore a primary object of this invention to provide a new and improved utility table.

It is another object of this invention to provide a new and improved utility table having improved electrical outlet means thereon.

It is still another object of this invention to provide an electrical outlet means for use with a utility table which is releasably attached thereto and easily interchanged with other utility tables.

It is yet another object of this invention to provide a new and improved electrical outlet means for utility tables having structure for extension cord storage.

The invention is illustrated in a preferred embodiment in the accompanying drawings, in which:

FIG. 1 is an isometric view of the utility table embodying the electrical outlet means of this invention;

FIG. 2 is an enlarged front elevational view of the electrical outlet means of this invention;

FIG. 3 is a broken top plan view of the electrical outlet means shown in FIG. 2;

FIG. 4 is a section view taken along the line 4—4 of FIG. 3 showing an edge of a shelf of the utility table in dotted outline; and FIG. 5 is a section view taken along the line 5—5 of FIG. 2.

In FIG. 1 the outlet means 10 of this invention is shown in use with a utility table 11 having a plurality of upright legs 12 with caster means 12a secured to the foot of each leg and a plurality of spaced generally parallel shelves 13 secured to each leg generally perpendicular thereto. Each shelf has a peripheral lip or flange 13a which extends slightly above and slightly below the plane of the shelf.

The outlet means 10 includes a channel-shaped front body member 14 preferably formed of sheet metal having a front face portion 18 and rearwardly extending top and bottom walls 20. The front member 14 is secured to a back body member 16 also preferably formed of sheet metal.

The back member 16 is of relatively thin metal and has a back wall 22 which is substantially coextensive in length with the front member 14 and slightly wider than the height of the front member 14. Back member 16 further includes integral end walls 24 and 24a which extend perpendicularly forward from either end of the back wall 22 and cooperate therewith to completely enclose the front body member 14 and form a chamber 25 therein for housing electrical connections. The side walls 24 and 24a are of a size generally coextensive in area with the open U-shaped end of the front body member 14.

Flaring laterally outward from each side wall 24 and 24a along a line generally described by an extension of the front face 18 of the front member 14 are a pair of ears 26 and 26a, respectively, which in combination with the end walls 24 and 24a, provide a cord holder means about which the extension cord 27 of the outlet means 10 may be wrapped and therefore stored when the cord is not in use, as shown in FIG. 1.

Secured to the interior of the front body member 14 and extending out of the front face thereof are the female electrical outlet elements 30 and 30a for receiving mating male components of electrically operated devices which may be carried by the table 11. The associated wires which extend from the cord 27 to the female outlet members 30 and 30a, such as wire 34, are compactly carried within the interior chamber 25 of the outlet means. Fastening means, such as a conventional screw threaded fastener 36 and 36a, extend through aligned openings 38 and 40 in the front face of the front member and back portion of the back member, respectively, to secure the front and back body members as a unit. These fastening members 36 and 36a are adapted to extend through openings 42 formed in the flange portion 13a of the shelf 13 so that the outlet means 10 may be easily attached to the table 11 with the aid of a wing nut 44 threaded on that portion of the shank of the fastener 36 which extends beyond the flange 13a. The means of attaching the outlet means to the utility table is such that the outlet means may be easily secured to any given utility table 11 to adapt the same for use with electrically powered devices or removed therefrom when it is not needed.

The disclosure of this invention provides an outlet means for use with utility tables which may be easily secured to and detached therefrom. The need for having an electrical outlet on every utility table is eliminated since this removable outlet means of this invention may be attached only to those tables requiring such an outlet means for the electric devices borne thereby. The outlet means of this invention also provides a convenient means for storing the electric cord thereof when not in use. The ear portions 26 and 26a, which extend outwardly along the front edge thereof, provide a cord holder so that the cord may be easily wrapped therearound and neatly and satisfactorily stored thereby. The body members of the outlet are made of sheet metal and formed in simple configurations for cooperatively enclosing the internal chamber housing the electrical connections. Also, the fastening means, in addition to securing the outlet means to a utility table, serves the dual function of retaining the front and back body members in assembled relation together. Thus, this invention provides a detachable electrical outlet means for utility tables which has a cord storage means integral therewith, which outlet means is economical to produce and easily installed for use.

The foregoing detailed description is given for clearness of understanding only, and no unnecessary limitations should be understood therefrom for some modifications will be obvious to those skilled in the art.

I claim:
1. In a table for movie projectors or the like, a detachable outlet, comprising: a generally elongated box-like outlet panel having a front wall with at least one electrical outlet thereon and a rear wall in facial juxtaposition with said table, said outlet panel having fastening means attaching the outlet panel to the table with the rear wall in facial juxtaposition with the the table; an elongate extension cord secured to said outlet means for electrically connecting said outlet means with a source of electrical power; and a pair of ears extending laterally outwardly from opposite sides of the front wall and spaced outwardly from the table to form with the outlet panel a storage rack in which the cord when not in use may be wrapped in convolutions about the outlet panel and the convolutions will be confined by said ears.

2. In a table for movie projectors or the like, a detachable electrical outlet means, comprising: a channel shaped panel having a central front wall portion for mounting an electrical outlet, the panel having upper and lower flanges forming protective top and bottom walls for an internal chamber; a U-shaped member having a back wall and closed end walls embracing the channel shaped panel to completely enclose the internal chamber; fastening means maintaining the panel and U-shaped member in assembled relation and securing the outlet means to the table with said back wall in generally facial engagement with the table; an elongate extension cord secured to said outlet means for operably engaging the electrical outlet with a source of electric power; and a pair of ears formed generally co-extensive with said front wall portion so that said ears, adjacent portions of said table, and said top, bottom and end walls form a spool about which said cord may be wrapped and retained against accidental dislodgment.

3. In a table for movie projectors or the like, a detachable electrical outlet means, comprising: a box-like panel having front, rear, top, bottom and side walls with electrical outlets in said front wall; a pair of arms each extending laterally outwardly from the front wall of said panel, said arms and adjacent portions of said table forming a notch for retaining a cord against axial movement relative to the outlet box when the cord is wrapped about the top, bottom and side walls; and fastening means securing the box-like to the table.

References Cited by the Examiner

UNITED STATES PATENTS

| | | |
|---|---|---|
| 1,727,032 | 9/29 | Guignon. |
| 1,875,699 | 9/32 | Brady. |
| 1,898,282 | 2/33 | Almcrantz _____ 220—319 X |
| 1,955,203 | 4/34 | Salomon _____ 312—223 |
| 2,137,536 | 11/38 | McConnell _____ 339—22 X |
| 2,423,757 | 7/47 | Dedge _____ 220—3.9 |
| 2,433,917 | 1/48 | McCartney. |
| 2,491,841 | 12/49 | Walter _____ 317—99 |
| 2,962,281 | 11/60 | Hodgson. |
| 3,013,105 | 12/61 | Craig _____ 174—67 |
| 3,049,688 | 8/62 | Sinopoli _____ 174—58 X |
| 3,094,584 | 6/63 | Liberman et al. _____ 339—22 X |

JOHN F. BURNS, *Primary Examiner.*

JOHN P. WILDMAN, E. JAMES SAX, DARRELL L. CLAY, *Examiners.*